United States Patent [19]
Nakatsugawa

[11] Patent Number: 6,094,462
[45] Date of Patent: Jul. 25, 2000

[54] DATA DEMODULATOR AND DATA DEMODULATING METHOD

[75] Inventor: Yoshinori Nakatsugawa, Shizuoka-ken, Japan

[73] Assignee: Yazaki Corporation, Tokyo, Japan

[21] Appl. No.: 09/012,485

[22] Filed: Jan. 23, 1998

[30] Foreign Application Priority Data

Jan. 29, 1997 [JP] Japan .................................. P 9-015574

[51] Int. Cl.$^7$ ...................................................... H04N 5/92
[52] U.S. Cl. ............................................ 375/324; 329/347
[58] Field of Search ................................... 375/324, 372, 375/377; 329/315, 345, 347

[56] References Cited

U.S. PATENT DOCUMENTS

| | | | |
|---|---|---|---|
| 3,838,416 | 9/1974 | Brown | 341/108 |
| 3,967,264 | 6/1976 | Whyte et al. | 340/310.08 |
| 4,063,038 | 12/1977 | Kaul et al. | 370/545 |
| 4,433,415 | 2/1984 | Kojima | 714/755 |
| 4,891,808 | 1/1990 | Williams . | |
| 4,939,734 | 7/1990 | Heichler | 714/790 |
| 5,345,449 | 9/1994 | Buckingham et al. . | |
| 5,917,857 | 6/1999 | Tanaka et al. | 375/253 |

FOREIGN PATENT DOCUMENTS

| | | |
|---|---|---|
| 60-203095 | 10/1985 | Japan . |
| 62-125786 | 6/1987 | Japan . |
| 4-326270 | 11/1992 | Japan . |

OTHER PUBLICATIONS

Herther, Nancy K., "CD–Rom Drives—A Buyer's Guide", Online Inc., USA, Jul.–Aug. 1996, vol. 20, No. 4, pp. 80–85.

Nosaka, K., et al., "CD–Rom Drive Unit CDR–36, CDR–83", NEC Technical Journal, Sep. 1991, vol. 44, No. 8, pp. 53–56.

Nosaka, K., et al., "CD–Rom Drive Unit CDR–72, CDR–82", NEC Technical Journal, Oct. 1990, vol. 43, No. 9, pp. 131–133.

*Primary Examiner*—Young T. Tse
*Attorney, Agent, or Firm*—Finnegan, Henderson, Farabow, Garrett & Dunner, L.L.P.

[57] ABSTRACT

A plurality of serial-in/parallel-out shift registers(9,11,13,15) can input n-tuple speed data (where n is a positive integer) in series in synchronism with an n-tuple speed sampling clock sequentially via input ports(2a,2b) to store them within one period of an M·n-tuple speed frame clock (where M is a positive integer and M≧2), and then output the n-tuple speed data in parallel every period of the M·n-tuple speed frame clock. A plurality of parallel-in/serial-out shift registers(17,19,21,23) can input in parallel the n-tuple speed data which are output from the plurality of serial-in/parallel-out shift registers(9,11,13,15) respectively, and then demodulate the n-tuple speed data into M·n-tuple speed data in synchronism with an M·n-tuple speed sampling clock and outputting the M·n-tuple speed data in serial.

3 Claims, 3 Drawing Sheets

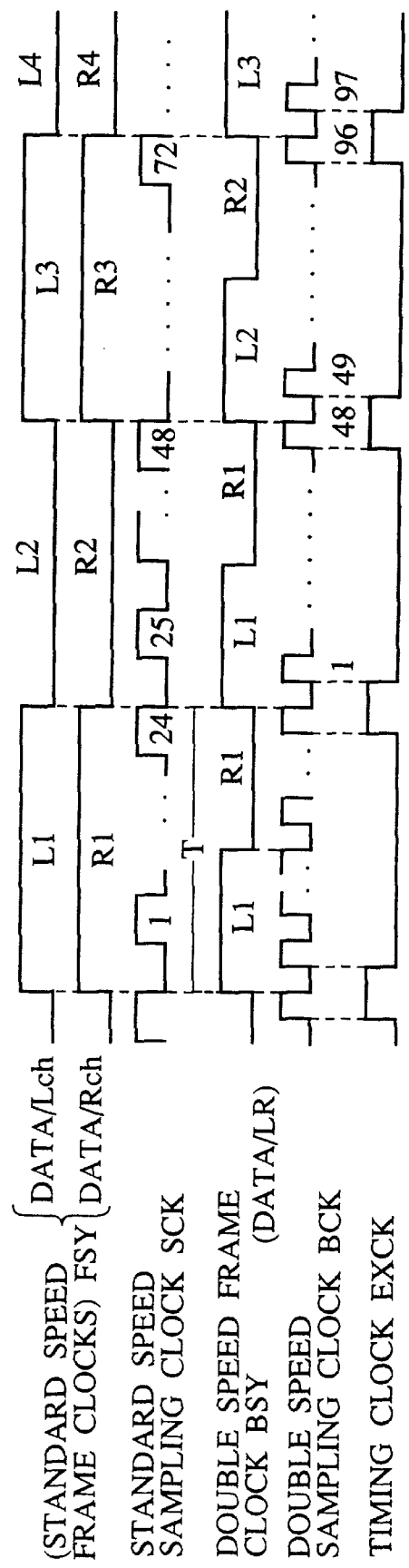

DATA DEMODULATOR AND DATA DEMODULATING METHOD

BACKGROUND OF THE INVENTION

1. Field of the Invention

The present invention relates to a data demodulator and a data demodulating method capable of demodulating n-tuple speed data (where n is a positive integer) such as sound, image, etc. in the digital form, which are input from an information supply source such as a CD-ROM drive, into M·n-tuple speed data (where M is a positive integer and M≧2) in real time and then outputting M·n-tuple speed modulated data.

2. Description of the Prior Art

In recent years, various information reproducing devices for reproducing digital data such as sound, image, etc. stored in an information storing medium such as CD (Compact Disc), CD-ROM, etc. have been rapidly spread.

In particular, for example, in a CD-ROM drive which can play the digital data stored in the CD-ROM, a higher data transfer speed is pushed forward in answer to the request to play smoothly multimedia soft such as music, moving picture, etc. This higher data transfer speed can be achieved as an integral multiple of a standard speed of 1.50 Kbyte/sec which is a data transfer speed of a music CD player.

In the above situation that such higher data transfer speed is pushed forward day after day, there have been on the market various CD-ROM drives which can play the digital data in mutually different tuple speed modes such as double speed, treble speed, quadruple speed, sextuple speed, octuple speed, nonuple speed, etc. according to plural standards respectively.

However, in the above situation that the CD-ROM drives which are operated in mutually different tuple speed modes according to plural standards have been brought to the market, there has been a to-be-overcome drawback, for example, that there is a possibility of bringing about such a situation that the digital data which are reproduced at a tuple speed mode, e.g., double speed, treble speed, quadruple speed, octuple speed, etc. peculiar to a certain CD-ROM drive and then transmitted therefrom at a predetermined transfer speed cannot be received by an image reproducing unit on the receiver side.

The above situation has occurred in the event that the data transfer speed on the receiver side does not coincide with the data transfer speed on the transmitter side. In order not to bring about such situation, there has been such a disadvantage for the user of the CD-ROM drive in expanding the user's system that not only the user has to prepare another receiver side device which is able to receive the digital data at the transfer speed corresponding to the tuple speed mode of his or her own CD-ROM drive, but also the user has to newly introduce another transmitter side device with a different tuple speed mode into the user's system after an image reproducing system has been constructed by combining the CD-ROM drive as the transmitter side device with the image reproducing unit as the receiver side device, for instance.

SUMMARY OF THE INVENTION

The present invention has been made in light of the above circumstances, and it is an object of the present invention to provide a data demodulator and a data demodulating method which are capable of outputting M·n-tuple speed demodulated data sequentially in real time from plural serial-in/parallel-out shift registers when n-tuple speed data are input sequentially into the plural serial-in/parallel-out shift registers respectively, by setting, within one period of an M·n-tuple speed frame clock, a period of time which is needed from a start of inputting n-tuple speed data into the serial-in/parallel-out shift registers to an end of outputting M·n-tuple speed data.

In order to achieve the above object, according to a first aspect of the present invention, there is provides a data demodulator comprising: input ports for inputting n-tuple speed data (where n is a positive integer), which are send out in a digital form from an information supply source sequentially; a plurality of serial-in/parallel-out shift registers for inputting the n-tuple speed data in series in synchronism with an n-tuple speed sampling clock sequentially via the input ports to store therein, and then outputting the n-tuple speed data in parallel every period of an M·n-tuple speed frame clock (where M is a positive integer and M≧2); a plurality of parallel-in/serial-out shift registers for inputting the n-tuple speed data which are output from the plurality of serial-in/parallel-out shift registers respectively in parallel, and then demodulating the n-tuple speed data into M·n-tuple speed data in synchronism with an M·n-tuple speed sampling clock and outputting the M·n-tuple speed data in serial; and an output port for outputting the M·n-tuple speed data which are output from the plurality of parallel-in/serial-out shift registers respectively; wherein a period of time which is required by the plurality of serial-in/parallel-out shift registers from a start of inputting the n-tuple speed data to an end thereof is set within one period of the M·n-tuple speed frame clock.

According to the present invention, the plurality of serial-in/parallel-out shift registers can input the n-tuple speed data in series in synchronism with an n-tuple speed sampling clock sequentially via the input ports to store therein, and then output the n-tuple speed stored data in parallel every period of an M·n-tuple speed frame clock. Then, a plurality of parallel-in/serial-out shift registers can input the n-tuple speed data which are output from the plurality of serial-in/parallel-out shift registers respectively in parallel, and then demodulate the n-tuple speed data into M·n-tuple speed data in synchronism with an M·n-tuple speed sampling clock and output the M·n-tuple speed data in serial. Since the period of time which is required by the plurality of serial-in/parallel-out shift registers from a start of inputting the n-tuple speed data to an end thereof is set within one period of the M·n-tuple speed frame clock, when the n-tuple speed data are input sequentially into the plurality of serial-in/parallel-out shift registers, the M·n-tuple speed demodulated data can be sequentially output from the plurality of parallel-in/serial-out shift registers. As a consequence, the demodulation process of data can be achieved in real time with a simple circuit configuration and without a large capacity buffer memory.

In the preferred embodiment of the present invention, the period of time which is required by the plurality of serial-in/parallel-out shift registers from a start of inputting the n-tuple speed data to an end thereof is set to one period of the M·n-tuple speed frame clock.

In the preferred embodiment of the present invention, the plurality of parallel-in/serial-out shift registers are connected mutually in serial.

In order to achieve the above object, according to a second aspect of the present invention, there is provided a data demodulating method of demodulating n-tuple speed data (where n is a positive integer) which are send out in a digital form from an information supply source sequentially into M·n-tuple speed data (where M is a positive integer and M≧2), the method comprising the steps of: inputting the n-tuple speed data in series in synchronism with an n-tuple speed sampling clock sequentially to store the n-tuple speed data within one period of an M·n-tuple speed frame clock, and then outputting the n-tuple speed data in parallel every period of the M·n-tuple speed frame clock; and inputting in parallel the n-tuple speed data which are output in parallel respectively, and then demodulating the n-tuple speed data into M·n-tuple speed data in synchronism with an M·n-tuple speed sampling clock and outputting the M·n-tuple speed data in serial.

According to the present invention, the n-tuple speed data can be input in series in synchronism with an n-tuple speed sampling clock sequentially via the input ports to store therein, and then the n-tuple speed stored data can be output in parallel every period of an M·n-tuple speed frame clock. Then, the n-tuple speed data which are output from the plurality of serial-in/parallel-out shift registers respectively can be input in parallel, and then the n-tuple speed data can be demodulated into M·n-tuple speed data in synchronism with an M·n-tuple speed sampling clock and the M·n-tuple speed data can be output in serial. Since the period of time which is required by the plurality of serial-in/parallel-out shift registers from a start of inputting the n-tuple speed data to an end thereof is set within one period of the M·n-tuple speed frame clock, when the n-tuple speed data are input sequentially into the plurality of serial-in/parallel-out shift registers, the M·n-tuple speed demodulated data can be sequentially output from the plurality of parallel-in/serial-out shift registers. As a result, the demodulation process of data can be achieved in real time with a simple circuit configuration and without a large capacity buffer memory.

The nature, principle and utility of the invention will become more apparent from the following detailed description when read in conjunction with the accompanying drawings.

BRIEF DESCRIPTION OF THE DRAWINGS

In the accompanying drawings:

FIG. 3 is a timing chart explaining an operation of the data demodulator according to the present invention.

DESCRIPTION OF THE PREFERRED EMBODIMENT

A data demodulator and a data demodulating method according to an embodiment of the present invention will be explained in detail with reference to accompanying drawings hereinbelow.

Figure 1:
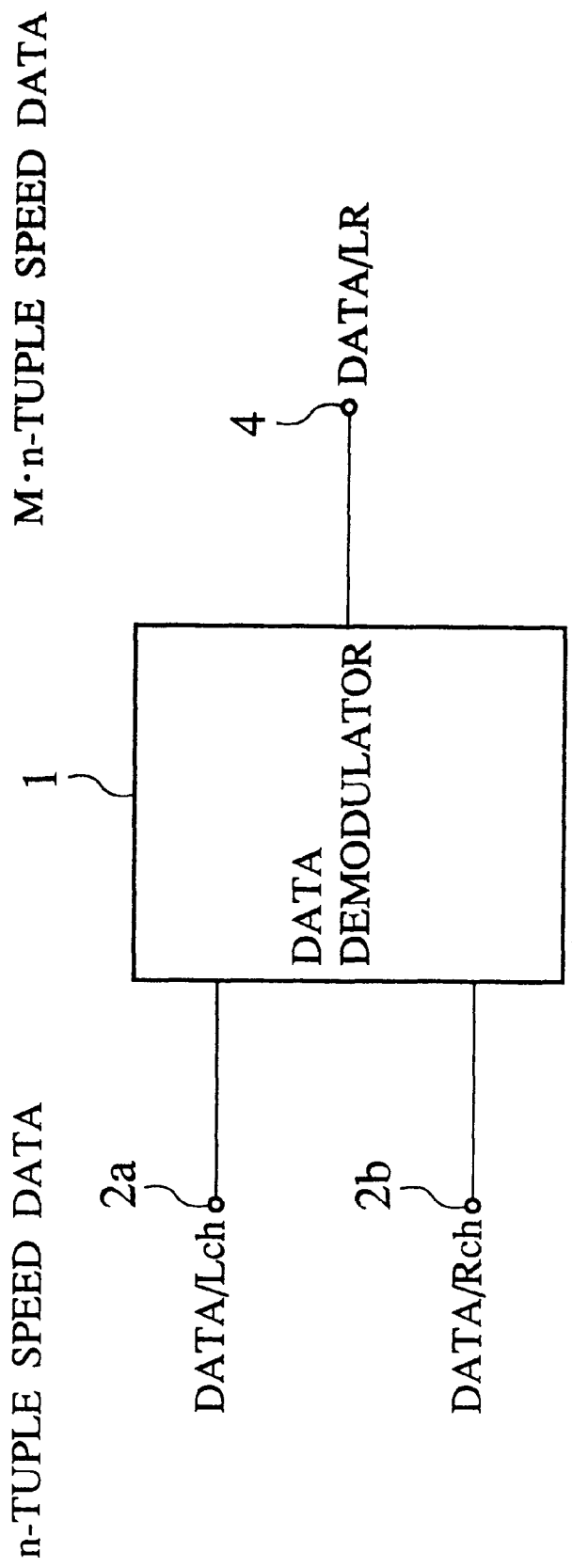
FIG. 1 is a schematic block circuit diagram showing a configuration of a data demodulator according to the present invention.

As shown in FIG. 1, a data demodulator 1 according to the present invention has a pair of first and second input ports 2a, 2b for inputting two-system n-tuple speed data (where n is a positive integer) DATA/Lch, DATA/Rch separated for left/right (LR) channels respectively, and an output port 4 for outputting M·n-tuple speed data (where M is a positive integer and M≧2) DATA/LR which include two LR channels alternatively. The data demodulator 1 has a function for demodulating, for example, two-system standard speed data DATA/Lch, DATA/Rch, which are sent out sequentially from a data modulator (not shown) which can modulate the M·n-tuple speed data such as the double speed data into the n-tuple speed data such as the standard speed data via a network and are separated for left/right channels, into double speed data DATA/LR which include two LR channels alternatively in real time.

The double speed data which have been subject to demodulation by the data demodulator 1 are sent out to a terminal apparatuses such as a double speed mode sound reproducing device, a personal computer, etc., for example. In the case that the double speed data are transmitted to the sound reproducing device, they can be reproduced in the form of sound in real time by the sound reproducing device.

Next, an internal configuration of the data demodulator 1 according to the present invention will be explained in detail with reference to FIG. 2 hereunder. In the present embodiment, taking as an example the case where two-system standard speed data DATA/Lch, DATA/Rch which are sent out sequentially from the data modulator via the network and are separated for respective left/right channels are demodulated into the double speed data DATA/LR which are sent out sequentially via a digital audio interface being standardized to constitute one frame of 48 bits by combining two left/right subframes with each other, the internal configuration of the data demodulator 1 will be explained hereunder.

Figure 2:
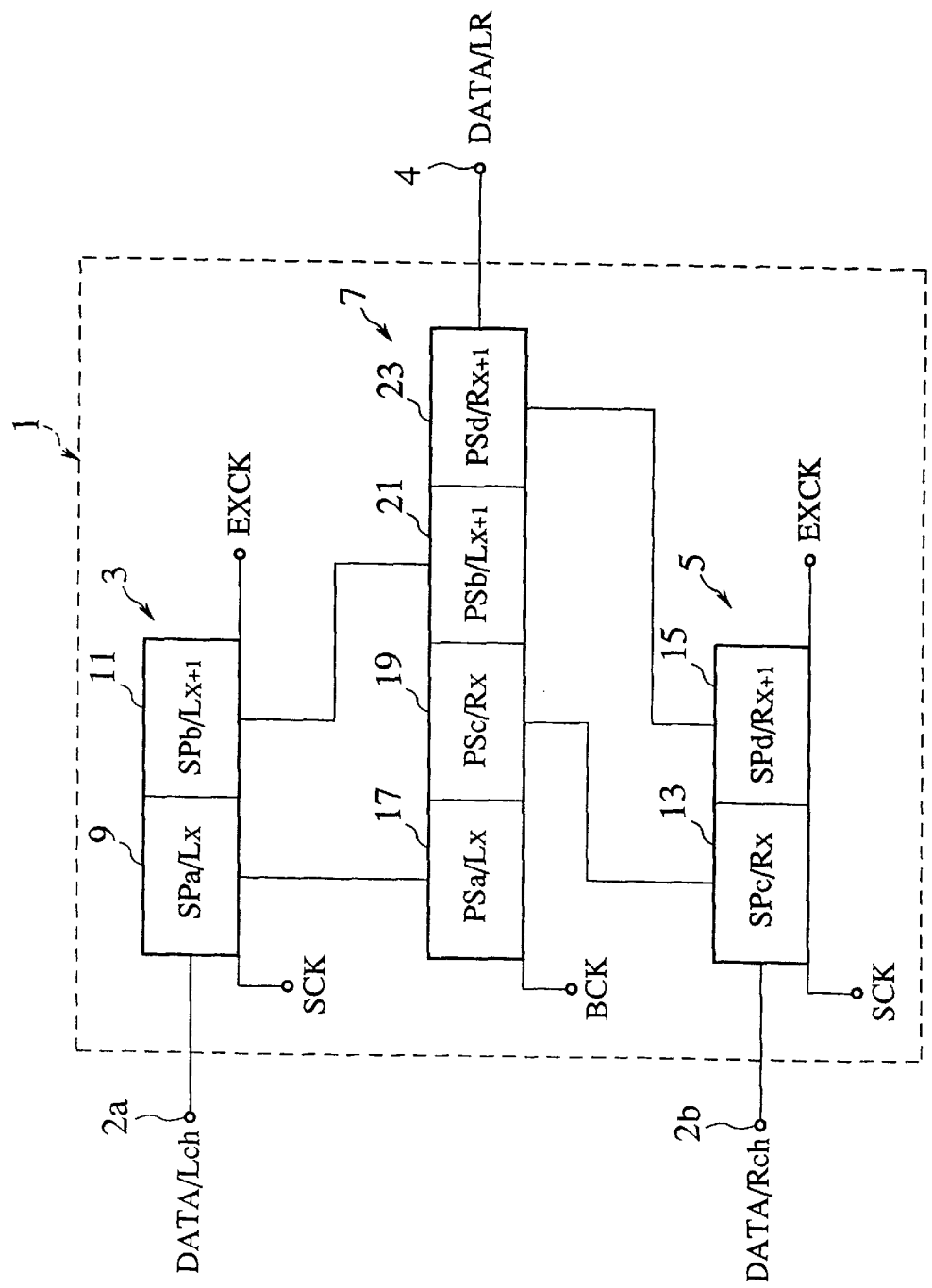
FIG. 2 is a block circuit diagram showing an internal configuration of the data demodulator according to the present invention.

As shown in FIG. 2, the data demodulator 1 according to the present invention comprises L-side/R-side serial-in/parallel-out (abbreviated as "SP" hereinafter) shift register groups 3, 5 with a 48-bit length, for example, for inputting separately the two-system standard speed data DATA/Lch, DATA/Rch which are separated for respective left/right channels in synchronism with a standard speed sampling clock SCK sequentially under an upper limitation of an amount of data which correspond to a ½ period (half frame) of unit frame of a standard frame clock to then storing the input data therein, and outputting the standard speed stored data in parallel at timings (described later) common to both channels; and a parallel-in/serial-output (abbreviated as "PS" hereinafter) shift register group 7 with a 96-bit length, for example, for inputting the standard speed data which are output in parallel from the L-side/R-side serial-in/parallel-out shift register groups 3, 5 respectively to store therein, and then demodulating the standard speed stored data in serial in synchronism with a double speed sampling clock BCK sequentially and outputting demodulated data.

The L-side SP shift register group 3 to which the standard speed data DATA/Lch for the L-side channel are input is constructed by connecting a pair of first and second SP shift registers SPa 9, SPb 11 having, for example, a 24-bit length serially. Like the L-side SP shift register group 3, the R-side SP shift register group 5 to which the standard speed data DATA/Rch for the R-side channel are input is constructed by connecting a pair of third and fourth SP shift registers SPc 13, SPd 15 having, for example, a 24-bit length serially.

The PS shift register group 7 is constructed by connecting serially fifth and seventh PS shift registers PSa 17, PSb 21 having, for example, a 24-bit length, to which the standard speed data DATA/Lch for the L-side channel are input in parallel from the first and second SP shift registers SPa 9, SPb 11 respectively, and sixth and eighth PS shift registers PSc 19, PSd 23 having, for example, a 24-bit length, to which the standard speed data DATA/Rch for the R-side channel are input in parallel from the third and fourth SP shift registers SPc 13, SPd 15 respectively.

Next, common timings used when the first to fourth SP shift registers SPa 9, SPb 11, SPc 13, SPd 15 output their standard speed stored data DATA/Lch, DATA/Rch to the PS shift register group 7 in parallel respectively will be explained with reference to FIG. 3 hereunder. First, a timing clock EXCK is generated which is kept at high data level only for a period of time ranging from a rise timing or leading edge of a final bit of a double speed sampling clock BCK in a certain frame of a double speed frame clock BSY to a rise timing or leading edge of a start bit of the double speed sampling clock BCK in a succeeding frame of the double speed frame clock BSY. Then, a trailing timing of a logical product data between the timing clock EXCK and the double speed sampling clock BCK, i.e., a start point of the frame of the double speed frame clock BSY can be set as a timing which is used when the first to fourth SP shift registers SPa 9, SPb 11, SPc 13, SPd 15 output their standard speed stored data DATA/Lch, DATA/Rch to the PS shift register group 7 in parallel respectively. In other words, at start points of respective frames of the double speed frame clock BSY, the first to fourth SP shift registers SPa 9, SPb 11, SPc 13, SPd 15 can output their standard speed stored data DATA/Lch, DATA/Rch to the PS shift register group 7 in parallel.

Various sampling clocks, various frame clocks, and various timing clocks used in the above embodiment can be generated by a clock generator (not shown) and are supplied appropriately to respective portions such as a plurality of shift registers.

In turn, an operation of the above data demodulator according to the present invention will be explained in detail with reference to FIGS. 2 and 3 hereinbelow.

According to the data demodulator 1 according to the present invention, first the first to fourth SP shift registers SPa 9, SPb 11, SPc 13, SPd 15 can receive two-system standard speed data DATA/Lch, DATA/Rch which are separated into the left/right channels to the PS shift register group 7 in serial in synchronism with the standard speed sampling clock SCK respectively under the upper limitation of an amount of data which correspond to the ½ period of unit frame of the standard frame clock FSY, and then store the standard speed data therein. Accordingly, at end points of respective half frames of the standard speed frame clock FSY, the standard speed data which correspond to the ½ period of unit frame of the standard frame clock FSY can be stored in the first to fourth SP shift registers SPa 9, SPb 11, SPc 13, SPd 15 respectively.

Then, at start point timings of respective unit frames of the double speed frame clock BSY, the first to fourth SP shift registers SPa 9, SPb 11, SPc 13, SPd 15 can output their standard speed stored data to the PS shift register group 7 in parallel respectively. Hence, the standard speed data which are aligned in predetermined sequence can be stored in the PS shift register group 7 in compliance with start point timings of respective unit frames in the double speed frame clock BSY.

In the next, the fifth to eighth PS shift registers PSa 17, PSc 19, PSb 21, PSd 23 constituting the PS shift register group 7 can output the standard speed data, which are aligned in predetermined sequence and stored respectively, in serial in synchronism with the double speed sampling clock BCK sequentially. Accordingly, the standard speed data which are stored in the PS shift register group 7 and correspond to half periods of the standard speed frame clock FSY in respective left/right channels can be demodulated into the double speed data which include the LR channels corresponding to one frame period of the double speed frame clock BSY alternatively, and then output via the output port 4 in synchronism with the double speed sampling clock BCK.

A period of time required from a time point when the first to fourth SP shift registers SPa 9, SPb 11, SPc 13, SPd 15 start to input the standard speed data to a time point when the standard speed data are demodulated into the double speed data DATA/LR in the fifth to eighth PS shift registers PSa 17, PSc 19, PSb 21, PSd 23 and output therefrom is set not to exceed the half period of the standard speed frame clock FSY, i.e., is set to just one period of the double speed frame clock BSY, for example, in this case. Therefore, at the time when the standard speed data DATA/Lch, DATA/Rch for LR channels are input sequentially into the first to fourth SP shift registers SPa 9, SPb 11, SPc 13, SPd 15 respectively, the first to fourth SP shift registers SPa 9, SPb 11, SPc 13, SPd 15 can complete their inputting operations within a time not to exceed the half period of the standard speed frame clock FSY respectively. For this reason, at the start point timing of respective unit frames of the double speed frame clock BSY, the standard speed data stored in the first to fourth SP shift registers SPa 9, SPb 11, SPc 13, SPd 15 can be output collectively in parallel to the PS shift register group 7. Then, the PS shift register group 7 can output the double speed data in serial sequentially while demodulating into the double speed data the standard speed data which are aligned in the predetermined sequence respectively and stored therein. As a result, according to the data demodulator 1 according to the present invention, the demodulation process of data can be achieved in real time with a simple circuit configuration and without a large capacity buffer memory.

Though has been explained in detail above, the present invention is not limited to the above-described embodiment, but other embodiments of the present invention may be implemented by making appropriate modifications to the above embodiment.

More specifically, in the present embodiment, the case where the double speed data which are sent out from the data modulator sequentially via the digital audio interface being standardized to constitute one frame of 48 bits by combining two left/right subframes with each other are separated into two left/right channels respectively and then modulated into two-system standard speed data has been explained as the example, but the present invention is not limited to this case. The present invention may be applied to demodulate the n-tuple speed data into the M·n-tuple speed data, for example, to demodulate the standard speed data into the treble or quadruple speed data, by setting the number of the shift register and the data bit length, the number of the timing clocks used when the SP shift registers output the standard speed data and the duty factor, the number of the timing clocks used when the shift registers output the modulated data and the duty factor, etc. to appropriate values respectively.

In the case where the standard speed data are demodulated into the treble speed data, another embodiment which is equipped with three input ports for inputting the treble speed data and one output port for outputting the standard speed data can be preferably employed as a configuration of the data demodulator according to the present invention.

In the present embodiment, the double speed data which are sent out via the digital audio interface being standardized to constitute one frame of 48 bits by combining two left/right subframes with each other has been explained, but the present invention is not limited to this example. The double speed data in which the bit number included in one frame is modified to an appropriate value, for example, the double speed data in which one frame is composed of 32 bits or 64 bits, may be selected as the demodulated data format.

Finally, in the present embodiment, the double speed data which are sent out via the digital audio interface being standardized to constitute one frame by combining a pair of left/right subframes with each other has been explained as the demodulated data format, but the present invention is not limited to this example. In addition to the above double speed data which are sent out via the digital audio interface being standardized as above, for example, monaural digital data or every kind of digital double data formatted according to every standard may be selected as the demodulation object.

What is claimed is:

1. A data demodulator comprising:

M input ports (where M is a positive integer and $M \geq 2$) for inputting n-tuple speed data (where n is a positive integer), which are sent out in a digital form from an information supply source sequentially;

M serial-in/parallel-out shift registers for inputting the n-tuple speed data in series in synchronism with an n-tuple speed sampling clock sequentially via the M input ports to store therein, and then outputting the n-tuple speed data in parallel every period of an M·n-tuple speed frame clock;

a parallel-in/serial-out shift register capable of storing data from the whole of the M serial-in/parallel-out shift registers, for inputting the n-tuple speed data together in parallel which are output from the M serial-in/parallel-out shift registers respectively, and then demodulating the n-tuple speed data into M·n-tuple speed data in synchronism with an M·n-tuple speed sampling clock and outputting the M·n-tuple speed data in serial; and an output port for outputting the M·n-tuple speed data which are output from the parallel-in/serial-out shift register;

wherein a period of time which is required by the M serial-in/parallel-out shift registers from a start of inputting the n-tuple speed data to an end thereof is set within one period of the M·n-tuple speed frame clock.

2. A data demodulator according to claim 1, wherein the period of time which is required by the M serial-in/parallel-out shift registers from a start of inputting the n-tuple speed data to an end thereof is set to one period of the M·n-tuple speed frame clock.

3. A data demodulating method of demodulating n-tuple speed data (where n is a positive integer) which are sent out in a digital form from an information supply source sequentially into M·n-tuple speed data (where M is a positive integer and $M \geq 2$), the method comprising the steps of:

inputting, to M serial-in/parallel-out shift registers respectively, the n-tuple speed data, which are input via M input ports, in series in synchronism with an n-tuple speed sampling clock sequentially to store the n-tuple speed data within one period of an M·n-tuple speed frame clock, and then outputting the n-tuple speed data in parallel every period of the M·n-tuple speed frame clock; and inputting in parallel, to a parallel-in/serial-out shift register capable of storing data from the whole of the M serial-in/Darallel-out shift registers, the n-tuple speed data together which are output in parallel respectively, and then demodulating the n-tuple speed data into M·n-tuple speed data in synchronism with an M·n-tuple speed sampling clock and outputting the M·n-tuple speed data in serial.

* * * * *

UNITED STATES PATENT AND TRADEMARK OFFICE
CERTIFICATE OF CORRECTION

PATENT NO. : 6,094,462　　　　　　　　　　　　　　　　Page 1 of 1
DATED : July 25, 2000
INVENTOR(S) : Nakatsugawa It is certified that error appears in the above-identified patent and that said Letters Patent is hereby corrected as shown below:

Claim 3, Column 8,
Line 30, "serial-in/Darallel-out" should read -- serial-in/parallel-out --

Signed and Sealed this

Twenty-eighth Day of August, 2001

*Attest:*

*Nicholas P. Godici*

NICHOLAS P. GODICI
*Attesting Officer*　　*Acting Director of the United States Patent and Trademark Office*